US008532090B1

(12) United States Patent
Petit-Huguenin et al.

(10) Patent No.: US 8,532,090 B1
(45) Date of Patent: Sep. 10, 2013

(54) DISTRIBUTED LOCAL TELEPHONY GATEWAY

(75) Inventors: Marc Petit-Huguenin, Sunnyvale, CA (US); Isabelle Dalmasso, Magagnosc (FR); Barry D. Andrews, Palo Alto, CA (US); Bryan R. Martin, Campbell, CA (US)

(73) Assignee: 8x8, Inc., San Jose, CA (US)

( * ) Notice: Subject to any disclaimer, the term of this patent is extended or adjusted under 35 U.S.C. 154(b) by 961 days.

(21) Appl. No.: 12/139,313

(22) Filed: Jun. 13, 2008

Related U.S. Application Data

(63) Continuation of application No. 09/966,713, filed on Sep. 28, 2001, now Pat. No. 7,394,803.

(51) Int. Cl.
*H04L 12/66* (2006.01)

(52) U.S. Cl.
USPC .......................................... 370/352; 370/401

(58) Field of Classification Search
USPC .................. 370/352, 353, 354, 355, 356, 401
See application file for complete search history.

(56) References Cited

U.S. PATENT DOCUMENTS

| | | | | |
|---|---|---|---|---|
| 5,974,449 | A * | 10/1999 | Chang et al. | 709/206 |
| 6,181,694 | B1 * | 1/2001 | Pickett | 370/353 |
| 6,292,479 | B1 | 9/2001 | Bartholomew et al. | |
| 6,466,651 | B1 * | 10/2002 | Dailey | 379/37 |
| 6,477,164 | B1 | 11/2002 | Vargo et al. | |
| 6,564,214 | B1 * | 5/2003 | Bhide | 1/1 |
| 6,674,745 | B1 | 1/2004 | Schuster et al. | |
| 6,687,245 | B2 * | 2/2004 | Fangman et al. | 370/356 |
| 6,791,970 | B1 | 9/2004 | Ng et al. | |
| 6,873,616 | B1 | 3/2005 | Fedyk et al. | |
| 6,904,038 | B1 * | 6/2005 | Moon et al. | 370/353 |
| 6,944,151 | B1 | 9/2005 | Menard | |
| 6,947,410 | B1 * | 9/2005 | Schwartz et al. | 370/352 |
| 6,954,454 | B1 | 10/2005 | Schuster et al. | |

OTHER PUBLICATIONS

MicroTelco Gateway Phone Center, Quicknet Technologies, Inc., www.quicknet.net/products/mtg_phonecenter.htm.
Internet LineJACK , Quicknet Technologies, Inc., www.quicknet.net/products/ilj.htm.

* cited by examiner

*Primary Examiner* — Ricky Ngo
*Assistant Examiner* — Christine Ng (57) ABSTRACT

Aspects of the invention are directed to a telephony system that is adapted to receive, route, process, and deliver communications data using a cost-effective, user-friendly operations platform and a broadband communication network. For example, the system includes a computer server arrangement and a plurality of endpoint devices communicatively coupled to one or more communication channels comprising an Internet protocol (IP) network. Packet-based (VoIP) calls are transmitted over an IP network, and translated to standard PSTN call signals when necessary. The broadband telephony system of the present invention utilizes each user's own IP network endpoint device as not only each user's local gateway onto the IP network, but also as a remote gateway for bridging other user's calls from the IP network to a local PSTN network in order to reach non-users.

22 Claims, 2 Drawing Sheets

DISTRIBUTED LOCAL TELEPHONY GATEWAY

RELATED PATENT DOCUMENTS

This patent document is a continuation of U.S. patent application Ser. No. 09/966,713 filed on Sep. 28, 2001, and issued as U.S. Pat. No. 7,394,803, to which priority is claimed under 35 U.S.C. §120.

FIELD OF THE INVENTION

The present invention generally relates to communication systems and, more particularly, to broadband telephony services having distributed local gateways.

BACKGROUND OF THE INVENTION

The communications industry continues to rely upon advances in technology to realize higher-functioning systems at cost-effective prices. Telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few. Widespread acceptance and usage of communication systems and services are largely a function of cost and user convenience.

One of the current issues delaying the widespread adoption of Voice-over-Internet protocol (VoIP) technologies in the telephony space is that there is not currently a critical mass of end-users of the technology. Communication is a two-way process and therefore instituting a new communication network is a circular problem. A principle motivation for a user's interest in a particular communication network is the knowledge that a sufficient quantity of other users may be contacted through the communication network. Each new user utilizing a communication network also increases the utility of the communication network since the devices used to initiate communications also typically serves as an outlet to receive communication from other users.

There are very few companies who are deploying VoIP technologies for their private branch exchange (PBX) and communications needs. Thus, in attempting to increase the demand for VoIP technologies, end-users have no easy access to equipment implementing the technology. Individual consumers cannot purchase IP phones in the retail channel and plug it into a home DSL or broadband connection. Another problem is that specialized forms of end-user VoIP technology require special equipment, detailed computer knowledge or, at a minimum, the use of cumbersome (e.g., calling-card) services in order to access a VoIP network to gain access to low-cost toll bypass long distance services. Consequently, with too few users directly accessible through a VoIP network and non-users inaccessible, a VoIP-based telephony system has not yet attained widespread acceptance.

Conventional ITSP "hop-off" gateway services operate by placing a finite number of service provider-owned gateways (to the VoIP network) at various discrete geographic locations around the world. These gateways bridge a local PSTN and the Internet. Users must specifically access one of these gateways in order to jump from one side of the network to another. Typically centralized VoIP services are "invisible" to users, operating as any conventional long-distance carrier with users provided a system access telephone number and phone cards for metering system usage. This type of gateway service is expensive to operate because dedicated local multi-user network gateways providing termination services for a plurality of users are required. Owners of this dedicated equipment are only willing to exchange network termination service using their equipment for a fee, thus reducing cost savings to the consumer. Additionally, infrastructure costs of these termination centers cause VoIP deployment to be expensive, and therefore slow.

Accordingly, there is a need for a cost-effective approach for VoIP telephony services in order to gain widespread acceptance. Such an approach should take into consideration end-users' expectations of accessing any other telephone in the world using existing telephone equipment, user interfaces and user calling paradigms, while not requiring the deployment and services of dedicated centralized network infrastructure to bridge the IP and PSTN networks. A broadband telephony system and method that address the aforementioned problems, as well as other related problems, are therefore desirable.

SUMMARY OF THE INVENTION

The present invention is directed to a broadband telephony system having distributed local gateways. The present invention is exemplified in a number of implementations and applications, some of which are summarized below.

According to a one example embodiment, a broadband telephony system includes a plurality of remote endpoint devices coupled to a broadband data network, and a plurality of remote PSTNs coupled between the plurality of remote endpoint devices and a plurality of remote audio interfaces. Each remote endpoint device is coupled to one remote PSTN, each remote PSTN is coupled to more than one remote endpoint device, each remote PSTN is coupled to at least one remote audio interface, and each remote audio interface is coupled to one remote PSTN. An originating endpoint device is coupled between the broadband data network and a local audio interface adapted to communicate an audio signal, and the originating endpoint device is adapted to select a destination audio interface for delivery of the audio signal, the destination audio interface being one of the plurality of remote audio interfaces. A database, that is accessible over the broadband data network, is then used to determine an optimized path for the audio signal from the originating endpoint device to the destination audio interface; the database provides a correlation between each remote audio interface with one of the plurality of remote PSTNs, and each of the plurality of remote endpoint devices with one of the plurality of remote PSTNs.

According to another example embodiment of the present invention, a broadband telephony system includes an originating endpoint device, a plurality of destination endpoint devices, a registrar server and a database. Each of the destination endpoint devices is coupled between a broadband data network, one of a plurality of destination PSTNs, and one of a plurality of destination audio interfaces. The originating endpoint device is coupled between the broadband data network, a first PSTN, and a first audio interface adapted to communicate an audio signal. The originating endpoint device is adapted to designate an identifier of a destination audio interface for delivery of the audio signal. The database correlates identifiers of destination audio interfaces and destination endpoint devices with associated destination PSTNs. Coupled to the broadband data network, the registrar server is adapted to search in the database and select a path for the audio signal, from the originating endpoint device to a destination audio interface designated by the originating endpoint device, via a cost-optimized destination endpoint device associated with the destination PSTN which is correlated to the identifier of the designated destination audio interface.

Other example embodiments of the present invention include related methods for operating the broadband telephony network and variations to the above-summarized embodiments.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communication systems, including telephony systems, and has been found particularly suited to broadband data network telephony systems, including systems which route the communications via an Internet protocol (IP) network. While the present invention is not necessarily limited to such telephony systems, various aspects of the invention may be appreciated through a discussion of various examples using this context.

Aspects of the invention are directed to a telephony system that is adapted to receive, route, process, and deliver communications data using a cost-effective, user-friendly operations platform and a broadband communication network (e.g., with adequate bandwidth for processing calls using standard H.323 full duplex calls using a G.723.1 codec which requires approximately 16 kbps bandwidth, or higher-bandwidth codecs such a sG.729 or G.711). For example, the system includes a computer server arrangement and a plurality of endpoint devices communicatively coupled to one or more communication channels comprising an Internet protocol (IP) network. Packet-based (VoIP) calls are transmitted over an IP network, and translated to standard PSTN call signals when necessary. Calls include audio signals such as voice and facsimile transmissions. The broadband telephony system of the present invention utilizes each user's own IP network endpoint device as not only each user's local gateway onto the IP network, but also as a remote gateway for bridging other user's calls from the IP network to a local PSTN network in order to reach non-users. Users access the VoIP network of the present invention using the user-owned equipment (as a VoIP network endpoint device) they already have in place for accessing the Internet through a broadband channel. Additionally, the VoIP-based telephony system of the present invention provides an integral means to reach many IP network non-users, thus more-quickly establishing a sufficiently large geographically-distributed communications system.

In one example embodiment of the present invention, each endpoint device includes a broadband data network (the VoIP network) interface, a telephony network interface coupled to a local PSTN network and an audio interface. A more particular example embodiment of an endpoint device of the present invention is a computing device (e.g., a standard personal computer or LINUX) equipped with a broadband data network interface to DSL, cable, ISDN or other high-speed broadband data network access; a typical soundcard for voice and audio input/output coupled to a microphone and speaker or other similar configurations; and a telephony interface (e.g., an Internet "LineJACK™" telephone gateway card by Quicknet Technologies, Inc.), modem or similar device, coupled to a local PSTN, telephony interface being capable of initiating and handshaking calls on the PSTN. The physical interface to the PSTN network is also referred to as an FXO interface (i.e., Foreign Exchange-Office) and is capable of taking the phone line off-hook, dialing, and determining information about the far-end of a phone call such as dial tone detection, call progress detection, ringback/busy tone detection, etc. Any user computing device with access to both a local PSTN network with at least one telephone line and the broadband data network, can function as a local small-scale VoIP gateway that bridges the local PSTN and VoIP networks, and can function as a network termination center for a small number of other users.

As a variation to the above embodiment and also in accordance with the present invention, an appliance such as a conventional computer acts as the gateway between an IP phone and the system. In this type of embodiment, the computer can act as a broadband network interface for coupling the IP phone to the system, e.g., via the FXO interface. In various specific implementations, the protocol used for communication between the IP phone and the Internet include, among others, MGCP ("Media Gateway Control Protocol"), MEGACO, SIP, H.323 and SCCP ("Simple Conference Control Protocol"). The IP phone and appliance can be implemented and coupled to the Internet in various ways including, for example, using a commercially-available IP phone such as Cisco's model No. 7960 that connects to the local Ethernet network, in turn coupled to a local gateway, or using another IP phone that is slightly altered to include a dedicated built-in FXO port. In this embodiment, the built-in FXO port can be adapted for use to provide failover operation of the IP phone on the local PSTN during a network or power outage.

In another specific implementation that is directed to communication-security applications, the appliance is implemented to provide encryption and decryption for the IP phone.

Another example embodiment of an endpoint device of the present invention is a dedicated appliance device used in conjunction with ordinary telephone equipment (e.g., telephones, facsimile machines, answering machines, etc.). The dedicated appliance consists of at least one "FXS" (foreign-exchange service) interface port (which drives telephone equipment), a broadband data network (the VoIP network) interface port such as a 10/100-Base T Ethernet connection, and at least one FXO interface port. The FXS port(s) are coupled to local ordinary telephone equipment, the broadband data network port is coupled to the user's broadband network access, and the FXO port(s) are coupled to the user's local PSTN network. Optionally, the dedicated appliance device FXO interface is coupled to the user's local PSTN network similar to a 2-line phone connection to a PSTN, using an FXO 1 ("L1" for Line 1 and or "L2" for Line 2) port and an FXO 2 (L2) port. The dedicated appliance endpoint device includes an indicator, for example at least one "In-use" light, to signal the user when one or more of the FXO (to PSTN) ports are in use. For example, a dedicated appliance endpoint device of the present invention is implemented by adding an FXO interface card to a standard "Symphony" product from Centile, Inc. (a subsidiary of 8×8, Inc.), or to an "MH-2" (Audacity T2 Internet Telephony Processor-based) broadband data interface product available from Netergy Microelectronics, Inc. (a subsidiary of 8×8, Inc.)

In yet another example embodiment of the present invention, an endpoint device includes a plurality of PSTN intercouplings. For example, a PBX for business applications. In one example configuration, each line functions as a dedicated appliance device. In an alternative example configuration, a subset of lines function as dedicated appliances as detailed further above.

In another example embodiment of the broadband telephony network of the present invention, an endpoint device includes remote accessibility from a local PSTN to which it is coupled through an FXO. The endpoint device is configured to answer a telephone call from the PSTN, and route the call through the endpoint's broadband interface to the IP network to a destination audio interface as previously described. In this manner, a user is capable of accessing the broadband telephony system remote from their endpoint device. Likewise, "off-site" users not having an endpoint device may reach an endpoint device by calling through a local PSTN, and have their call processed by the endpoint device onto the broadband network and to a designated audio interface. The off-site user communicates to the local endpoint device via a destination identifier, and optionally, via a security identifier such as a personal identification number. For example, a user having an endpoint device at work is able to call the endpoint device from home to gain access to the broadband telephony system. Another example is a user having an endpoint device at home, and calling the endpoint device while away from home (but still within a region of the local PSTN to which the endpoint device is coupled) via the local PSTN to gain access to the broadband telephony system. A third example involves a user who may not have an endpoint device and calls the endpoint device of another (local) user to gain access to the broadband telephony system.

Computing and dedicated appliance-type endpoint devices, according to example implementations consistent with the present invention, use standard Internet protocol (SIP) for signaling and protocol. The computing-type endpoint device emulates a telephone interface through software using a display, keyboard, speaker and microphone of the computing device for user interaction. A user's own telephone set, plugged into the dedicated appliance-type endpoint device, is used as a telephone interface (audio interface) to the broadband telephony system of the present invention.

A user's endpoint device registers itself to an SIP registrar ("registrar") when coupled to the broadband data network (Internet or VoIP network). Registration is part of the SIP protocol specification. The registrar executes on third-party computer servers coupled to the broadband data network and deployed at one or more various locations on the VoIP network. Multiple SIP registrars are useful for scalability and redundancy, much like DNS servers are deployed on large-scale networks. In one example embodiment of the present invention, SIP registrar software runs on a Service Logic Execution Environment (SLEE), such as the "eSLEE" product available from 8×8, Inc. A web presence (e.g., a secure web site that is associated with an IP address of the installed system and accessible via the Internet) feeds information into the SIP registrar. The SIP registrar is responsible for registration, search and authentication of users and connection requests to prevent a broadband telephony system gateway from being hacked by an unidentified SIP client. Optionally, the individual user's preferences for the utilization of the user's endpoint device are also sent to the registrar as part of a registration process. The registrar server collects and maintains in a central database, all of the relevant information regarding endpoint devices that are currently active on the VoIP network, including correlations between a user's identifier (e.g., telephone number), endpoint device IP address, and local PSTN. Additionally, the central relational database has correlational data concerning non-user telephone numbers and associated PSTNs from which the registrar server can determine an endpoint device coupled to a PSTN associated with a designated non-user's telephone number.

According to one example embodiment of the present invention, endpoint devices are continuously coupled to the broadband network, for example through a cable or DSL connection. In an alternative example embodiment, endpoint devices are temporarily coupled to the broadband network, the endpoint devices registering their presence and availability with the SIP registrar upon connection to the network.

A user initiates a call through her own endpoint device. If the endpoint device is a dedicated appliance, the user designates an identifier of the party the user wishes to reach, for example, by simply dialing her own telephone set (audio interface) coupled to the endpoint device. The user may be prompted for a Personal Identification Number (PIN) in order to gain access to the device. Use of a computing-type endpoint device designates the identifier through the user's computer interface. The SIP registrar, through an SIP proxy, attempts to determine the least-cost routing path through the VoIP network to the dialed destination. In an alternative example embodiment of the present invention, the SIP registrar, through the SIP proxy, attempts to determine a routing path through a pre-defined preferred carrier. In the event a preferred carrier is not available, routing is switched to alternate carriers, improving reliability. If the call is local (e.g., within the user's local PSTN), the call is routed to a PSTN line coupled to the endpoint device. If the call is long distance, the endpoint device connects to the SIP proxy through the broadband data network. The SIP proxy runs on the computer server hosting the SIP registrar in one example embodiment of the present invention. The SIP proxy receives the identifier of the party designated by the user from the user's endpoint device.

If the designated party the user wishes to call is also a user having their own endpoint device, the SIP proxy then routes the call audio signal over the VoIP network and to the called user's VoIP endpoint device. The call is further routed by the endpoint device to the called user's audio interface, for example, their telephone set or computing device. If the designated party the user wishes to call is not a VoIP network user and does not have their own VoIP network endpoint device, the SIP proxy uses correlation data from the registrar, to first determine a remote PSTN that is local to the designated identifier and subsequently determine a VoIP endpoint device connected to the remote PSTN. The SIP proxy then routes the call audio signal over the VoIP network and to the determined VoIP endpoint device. The determined endpoint device further routes the call by making a local call through the remote PSTN to the called party. In this manner, one (remote) user's endpoint device is used as a bridge between the VoIP network and a remote PSTN for the benefit of another user.

Between individual users, the entire VoIP-based telephony network system works as a cooperative system. Users provide resources (e.g., endpoint devices) primarily as a local entry for another user to gain access to the system and allows other users to use the resources for remote termination of calls. In exchange, each user gains use of resources provided by the other users. Each user pays their own PSTN (e.g., local telephone bill) and broadband access (e.g., Internet provider bill) costs to connect their VoIP endpoint device. In one example embodiment of the present invention, the SIP registrar performs certain additional accounting and administrative functions concerning the exchange of capabilities between users (discussed below).

Figure 1:
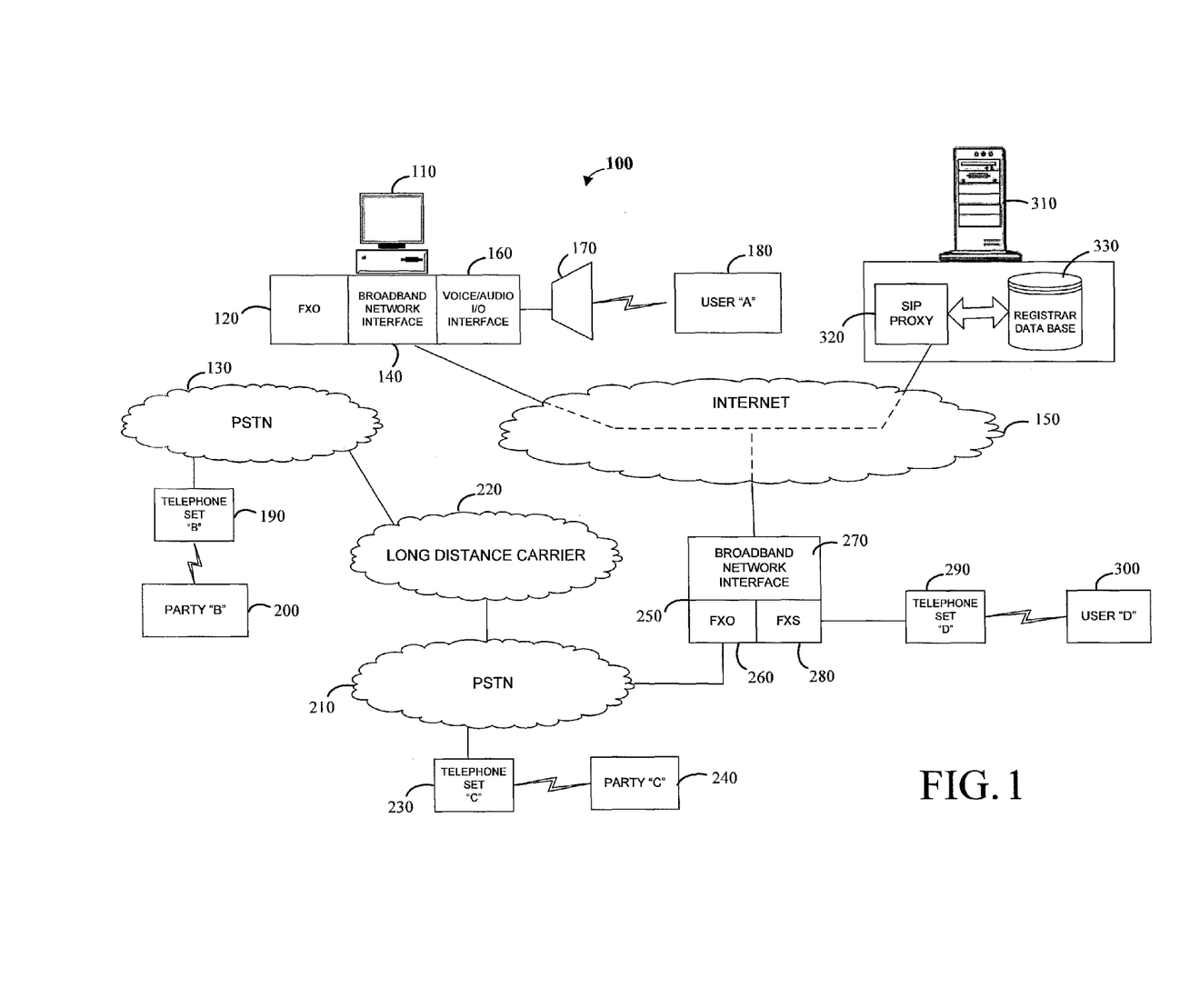
FIG. 1 is a communication network, according to an example embodiment of the present invention.

FIG. 1 illustrates one example embodiment of a broadband telephony system of the present invention 100. A computing endpoint device 110 includes an FXO interface 120 coupled to a first PSTN 130, a broadband network interface 140 coupled to a broadband data network (i.e., the Internet) 150, and an audio interface 160 coupled to an electromechanical transducer 170. Audio interface 170 communicates voice and audio signals to/from User A 180. For example, audio interface 170 is a speaker and microphone in one example embodiment.

Telephone set "B" 190 is coupled to PSTN 130 and telephone set "B" communicates voice and audio signals to/from Party B 200. Party B does not have their own endpoint device and is therefore, not a user (e.g., cannot initiate communications) of the broadband telephony system. PSTN 130 is coupled to a second PSTN 210 through a telephony long distance carrier 220. Telephone set "C" 230 is also coupled to PSTN 210, and telephone set "C" communicates voice and audio signals to/from Party C 240. Party C does not have their own endpoint device and is therefore, not a user (e.g., cannot initiate communications) of the broadband telephony system.

A dedicated appliance endpoint device 250 includes an FXO interface 260 coupled to PSTN 210, a broadband network interface 270 coupled to the broadband data network (i.e., the Internet) 150, and an FXS interface 280 coupled to telephone set "D" 290. Telephone set "D" communicates voice and audio signals to/from User D 300. A registrar server 310 includes a SIP proxy 320 communicatively coupled to a database 330. SIP proxy 320 is communicatively coupled to Internet 150 through registrar server 310.

Conventionally, if Party B wanted to call Party C, Party B dials on telephone set "B" a telephone number listed for Party C, the telephone number designating not only telephone set "C," but also signaling to PSTN 130 that telephone set "C" is not on PSTN 130 (i.e., it is "long distance") and designating a location of PSTN 210. Telephone set "B" operates to establish a telephonic path from telephone set "B" through PSTN 130, long distance carrier 220 and PSTN 210 to telephone set "C." Long distance carrier 220 typically charges Party B a toll for the service of interconnecting Party B's local PSTN 130 with destination PSTN 210

Several examples that follow are used to illustrate operation and features of the broadband telephony network of the present invention. In a first example, User A wants to call Party B, a local call. User A initiates a call through their own endpoint device 110. In this example, User A's endpoint device 110 is a computing-type endpoint device. User A designates an identifier for Party B by, for example, entering it through User A's computer interface. VoIP network 100 attempts to determine the most cost efficient path to the dialed destination. Because the call is local (e.g., within User A's local PSTN 130), the call is routed to PSTN 130 coupled to the endpoint device 110 and completed to Party B as a local telephone call.

In a second example, User A wants to call User D, a long distance call to another VoIP network user. Again, User A initiates a call through their own endpoint device 110 as described above. Since the call is long distance, endpoint device 110 connects to SIP proxy 320, through broadband network interface 140 and broadband data network 150, to communicate the identifier that User A designated for User D. In one embodiment of the present invention, SIP proxy 320 is running on the same computer that hosts SIP registrar database 330. SIP proxy 320 receives communication of the identifier for User D designated by User A from the User A's endpoint device. Because User D is also a VoIP network user having its own endpoint device 250, SIP proxy 320 can route the call through broadband network interface 140. The call is terminated at User D's endpoint device 250 and can be further routed by endpoint device 250 through broadband network interface 270 and FXS 280 to User D's audio interface (e.g., telephone set "D") 290 for User D's interaction.

In a third example, User A wants to call Party C, a long distance call to non-user. Again, User A initiates a call through their own endpoint device 110 as described above. Since the call is long distance, endpoint device 110 connects to SIP proxy 320, through broadband network interface 140 and the broadband data network 150, to communicate the identifier that User A designated for Party C. SIP proxy 320 receives communication of the identifier for Party C designated by User A from the User A's endpoint device. Party C is not a VoIP network user having their own endpoint device 250, so SIP proxy 320 uses correlation data from registrar database 330, to first determine a remote PSTN 210 that is local to the designated identifier (through which a free local can be placed to Party C), and subsequently determine a third party's VoIP endpoint device 250 connected to the determined remote PSTN 210. Endpoint device 250 uses SIP proxy 320 routing information to communicatively couple itself through broadband network interface 140, and over broadband data network 150 and to a third party's (User D's) endpoint device 250. The audio call signal is communicated via packetized digital data transmission between endpoint devices 110 and 250 respectively. The third party (User D) is not part of the call, but the third party's (User D's) endpoint device is used as a remote VoIP gateway to terminate the call off of the broadband network. The call is further routed by endpoint device 250 through broadband network interface 270 to FXO 260. FXO 260 completes User A's call to Party C by dialing Party C over the third party's (User D's) local PSTN 210 to Party C's audio interface (e.g., telephone set "C") for interaction with Party C. In this manner, User D's (remote) endpoint device 250 is not used to access User D, but rather as a bridge between the VoIP network and remote PSTN 210 to reach non-user Party C for the benefit of User A. The call from FXO 260 to Party C through PSTN 210 is a free local call for FXO 260.

Figure 2:
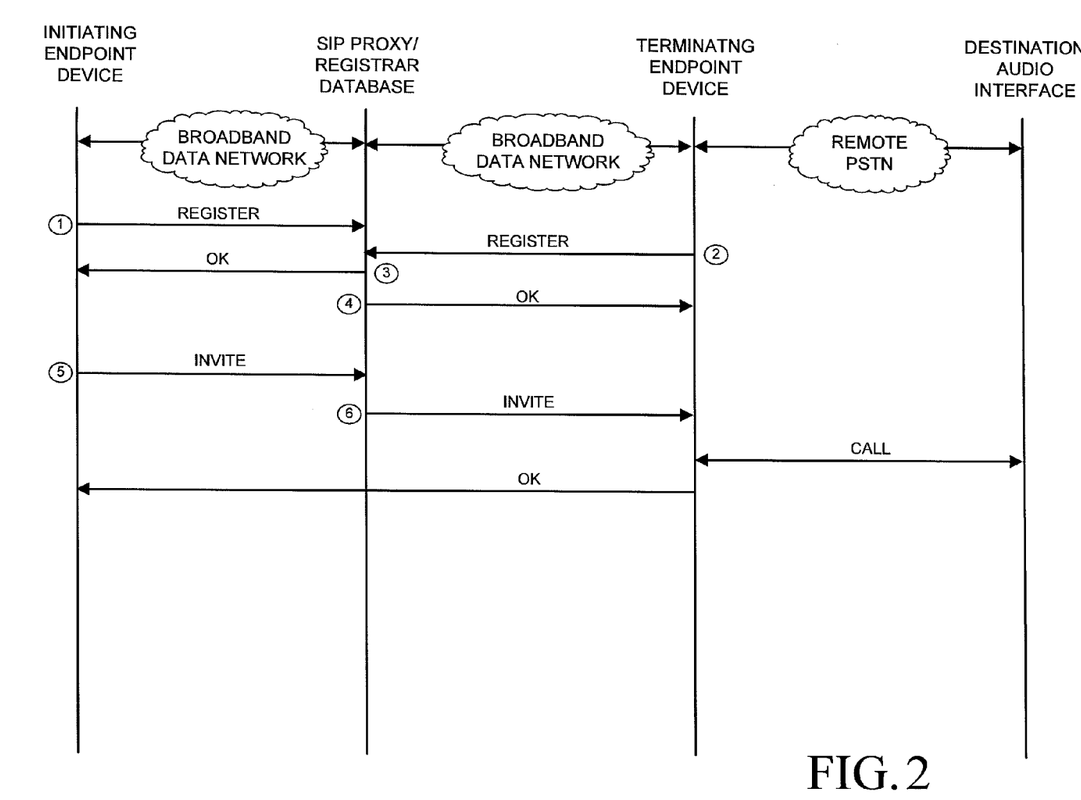
FIG. 2 is a signal diagram illustrating call processing through a communication network, according to an example embodiment of the present invention.

In accordance with both an example implementation of the present invention and Standards Recommendation, FIG. 2 further illustrates one example embodiment of "handshaking" signals between an initiating endpoint device (e.g., User A's endpoint device 110), SIP proxy 320/registrar database 330, a terminating endpoint device (e.g., User D's endpoint device 250) and a destination audio interface (e.g., telephone set "C" 230). As illustrated in FIG. 1, initiating endpoint device, SIP proxy/registrar database and terminating endpoint device are all coupled through a broadband data network. The terminating endpoint device and the destination audio interface are locally coupled through a PSTN. Illustrated at (1), initiating endpoint device registers its presence, as previously discussed, with SIP proxy/registrar database when first coupled to the broadband data network. Likewise at (2), terminating endpoint device registers with SIP proxy/registrar database when first coupled to the broadband data network. At (3) and (4), SIP proxy/registrar database acknowledges the presence of each endpoint device respectively. Upon call initiation at initiating endpoint device, an invitation is communicated from initiating endpoint device to SIP proxy/registrar database, as illustrated at (5). Identifiers for destination audio interface are included in the invite received by SIP proxy/registrar database from initiating endpoint device. At (6), SIP proxy/registrar database communicates an invite to terminating endpoint device, after determining an appropriate endpoint device through which to reach destination audio interface. The terminating endpoint device authenticates the invite from SIP proxy/registrar database to prevent unauthorized usage of the telephony system, and coordinates placing a free local call to the destination audio interface. Once a connection is established through the PSTN, terminating endpoint device signals initiating endpoint device that a channel is established to the destination audio interface and communication of an audio signal may commence. In a further example embodiment of the present invention, communication of the audio signal is encrypted to prevent interception by unauthorized parties.

For more information regarding uses and implementations of such protocols, reference may be made to Standards' Recommendations such as: RFC2543—"SIP: Session Initiation Protocol"; RFC2806—"URLs for Telephone Calls"; RFC2848—"The PINT Service Protocol Extensions to SIP and SDP for IP Access to Telephone Call Services"; and RFC2976—"The SIP INFO Method" which are fully incorporated herein by reference.

In one example embodiment of a method of controlling the broadband telephony system of the present invention, including a user's access, is provided. Administrative management is implemented by the SIP registrar. As part of a registration process, a user's capabilities (i.e., resources, preferences, billing arrangements, etc.) are exchanged between the user's endpoint device and the SIP registrar, from which controls to ensure operability of the network for all users are established. Operation of the telephony system of the present invention is coordinated using one or more of the following control and regulation methods, alone or in combination, as applicable and necessary to enable use of the broadband telephony network by a plurality of users having diverse communications needs. Control and regulation of the telephony system is implemented by imposing definable operational limitations and/or imposing financial transfer payments (e.g., differential billing adjustments) associated with various system operational modes by a particular user.

Long distance call routing is funneled through the SIP registrar to correlate a designated identifier and determine an available remote endpoint device through which to terminate a call from the broadband telephony network. Therefore, the SIP registrar is used as a point of control over resources associated with the broadband telephony system. Example embodiments of the broadband telephony system control methods of the present invention are discussed below.

In a first embodiment, an operational restriction limits a maximum duration that an individual user's endpoint device is allowed to access services of the broadband telephony system of the present invention (e.g., to initiate calls, or alternatively, to both initiate and receive calls) within a specified time period, for example, per month. Quantity and quality of time blocks are selectable by each user from a system operator or administrator, for example. The present invention contemplates time blocks having various qualities and associated values. Time block quality is differentiated, for example, by time of use, geographic region, size of time block, accessibility to off-network non-users, and other commercial criteria. In one example embodiment of operating and controlling the telephony system of the present invention, the SIP registrar meters system access and use of each endpoint device. System control parameters are supervised and enforced at the time of call routing operations.

In a second embodiment, an operational restriction limits a maximum number or duration that an individual user's endpoint device is allowed to be accessed from the broadband telephony system by other users within a specified time period, for example, per month and optionally per day or by time of day and day of week. In one example embodiment of operating and controlling the telephony system of the present invention, after terminating a pre-defined number or duration of calls, for example, a user's endpoint device is excluded by the SIP registrar database from being available for any additional users as a remote endpoint device for some period of time (e.g., through the end of a billing period, or alternatively, during a pre-defined time interval on specified days). In another example embodiment, local gateway congestion is minimized by accessing users' register of usage policies for the endpoint devices respectively associated with the users listed in the register. In one example, a user specifies that their endpoint device will not be used by the user during the business day hours of Monday through Friday, and is available for exclusive use by the telephony network to terminate calls, so that the telephony network can achieve maximum use of the gateway during the specified days/hours.

In a third embodiment, an operational restriction limits a maximum differential duration that an individual user's endpoint device is allowed to access services of the broadband telephony system of the present invention (e.g., to initiate calls, or alternatively, to both initiate and receive calls) in excess of the duration that the individual user's endpoint device is accessed from the broadband telephony system by other users within a specified time period, for example, per month and optionally per day or by time of day and day of week. In one example embodiment of operating and controlling the telephony system of the present invention, an accumulated time that a user's endpoint device is in use by the broadband telephony system is metered, the metered accumulated time being incremented when the user's endpoint device is used by the user originating calls to remote endpoint devices, and decremented when others use the user's endpoint device as their remote endpoint device to terminate calls. In alternative example embodiments of operating and controlling the telephony system of the present invention, a user's metered accumulated time is not decremented when the user is the ultimate destination for another's network call. In another alternate embodiment of the present invention, a user's metered accumulated time is decremented by some factor when the user's endpoint device is available to be used by the telephony system as a terminating endpoint device, even if no calls are actually terminated by the user's endpoint device within a given time period.

In a third embodiment, an operational restriction limits a maximum differential duration that an individual user's endpoint device is allowed to be accessed from the broadband telephony system by other users in excess of the duration that an individual user's endpoint device accesses the broadband telephony system as an call-originating endpoint device. This method is similar to the method described above to differentially limit a user's access to the system, instead of essentially differentially limiting the system's access to the user's endpoint device.

The above-described operational restrictions to control operation of the broadband telephony system of the present invention are optionally implemented, not as absolutely prohibited restrictions, but rather with associated differential costs to the user to motivate desired system usage behavior. In one example embodiment of the present invention, each user is billed for system resources and services used, and credited for system resources and services provided. For example, each endpoint device is configurable with a dialing plan so that the user's local dialing and toll considerations are well-defined. Dialing plans are configurable by end-user and/or the telephony network. Dialing plan information is exchanged from an endpoint device to the SIP registrar at registration. Optionally, dialing plan information is exchanged via an external interface, such as through mail, telephone or Internet web page access. Periodically, an accounting and payment transfer is effected to balance accounts between users, for example, a central entity coordinating billing and transfer payments transactions. Ultimate enforcement of cost-motivated usage is implemented by controlling a user's access to the entire system, or a portion thereof.

In one example embodiment of the broadband telephony network of the present invention, the SIP registrar records a log of transactions, used in part to prevent anonymous calls from being attributed to an endpoint device owner (user), rather than the real caller. The broadband telephony system includes a billing system, account consultation, network messaging and other enhanced services.

Further example embodiments of endpoint devices of the present invention include broadband functionality expanded beyond voice communication services. In one example embodiment of the present invention, an endpoint device includes conventional answering machine functions in addition to endpoint device functionality, the traditional answering machine features being remotely accessible through the PSTN or broadband network coupled to the endpoint device. The endpoint device is optionally configured to route calls over the VoIP network as opposed to recording a message. In one embodiment, only pre-defined calls are routed over the VoIP network, for example, important calls from selected callers. A user interface, for example, the Service Creation Environment from 8x8, Inc. is optionally used to customize operation of the endpoint device.

In another example embodiment of the broadband telephony system of the present invention, long-distance messaging services are included with local calls being re-routed to distant message delivery facilities through the broadband network.

In one example embodiment of the present invention, if a user wants or needs to use their own endpoint device, for example to make a local call to their PSTN, while the user's endpoint is being used as a remote endpoint device (i.e., gateway) to terminate a call in progress from the VoIP network for another user, notice is communicated to the SIP registrar. The SIP registrar searches for another available gateway local to the user's PSTN through which the call in progress can be re-routed over the VoIP network. If such an alternate gateway for the call in progress cannot be found, a queuing mechanism in the SIP registrar alerts the parties to the call in progress (via a call waiting tone or other message) that the call in progress will be interrupted in a specified amount of time, for example, 1 minute. The user of the call in progress connection (including the endpoint device needed by its owner/user) is disconnected and reconnected via the alternative gateway configuration in a short period of time, for example, a few seconds.

In another alternative embodiment of the present invention, an endpoint device includes an emergency switch or mechanism that would immediately and unconditionally disconnect any third-party gateway usage so that a call can be made on the local PSTN by the endpoint device's user promptly, for example, a 911 call. The emergency switch is manually-activated by the user in one example embodiment. Alternatively, the emergency switch is activated electronically if the user designates an emergency identifier, for example, 911, or the telephone number of a emergency organization. Optionally, a user's activation of their emergency switch is metered and included in a system control method detailed further below.

Another aspect of the present invention involves an unconditional override of the local gateway in response to a signal from the user's alarm system. For example, a user's home alarm system is programmed with an escape code that causes the system to immediately disconnect any third parties who are using the local gateway and thereby permitting the alarm system to place a call in response to sensing an alarm condition.

Endpoint devices coupled to a local PSTN through a 2-line configuration, as set forth above, provide additional control options. 2-Line endpoint devices are configurable so that one, or optionally, two lines are available as remote endpoint devices for terminating other user's calls. When two lines are available, emergency switch operation for one or both lines is arranged per line as described above for a single line endpoint device. Operational restrictions are configurable to one or both lines identically, or optionally, each line is configured to operate according to unique registration parameters. One line is optionally restricted from use by the broadband system altogether, thereby eliminating the need for an emergency switching mechanism. Aggregated billing and system usage arrangements are possible for users providing two lines of IP network to PSTN coupling. For example, in a differential use metering arrangement, the user-initiated call accumulated time is offset by the sum total of time if one line is used by others to terminate network calls plus the time the second line is used (if made available to other broadband network users) by others to terminate network calls. Therefore, by providing more resources to the telephony system, a user is able to obtain use of more resources from the telephony system.

In one example embodiment of implementing the broadband telephony system of the present invention, endpoint devices are provided to users at low or no cost in order to "bootstrap" the process of establishing a sufficient quantity of geographically-diverse users. For example, a limited quantity of endpoint devices are provided to users coupled to selected PSTNs, the PSTNs being selected to provide network coverage where insufficient numbers of users exists. In another example embodiment of implementing the broadband telephony system of the present invention, a portion of an endpoint device is provided at low or no cost to selected users. For example, software but not hardware, or alternatively, a broadband interface for a pre-defined introductory period of time. In one example embodiment of implementing the broadband telephony system of the present invention, a free LINUX version is offered to initially populate a system having a sufficient number of users, where an FXS is simulated by a sound card.

The present invention should not be considered limited to the particular examples described above. Various modifications, equivalent processes, as well as numerous structures to which the present invention may be applicable fall within the scope of the present invention, as fairly set forth in the appended claims.

What is claimed is:

1. An end-user device, comprising:
   a telephony port in the end-user device for connecting to a local PSTN using a single line Foreign Exchange-Office (FXO) interface;
   an audio interface in the end-user device configured and arranged to generate audible sounds in response to receiving audio communication data;
   a packet-based interface in the end-user device for connecting to a packet-based network; and
   a routing controller, configured and arranged in the end-user device, for
      receiving, from the packet-based interface, audio communication data that includes an indication of a destination device,
      providing, in response to determining that the end-user device corresponds to the destination device, the audio communication data to the audio interface,
      in response to determining that the destination device corresponds to a destination device other than the end user device,
         dialing the destination device using the telephony port and the single line;
         communicating the audio communication data to the telephony port and over the single line FXO interface, and
      detecting an outgoing call from the audio interface and, in response thereto, applying a rule that dictates priority of the audio interface over audio communication data from the packet-based interface for connecting the outgoing call over the single line FXO interface.

2. The end-user device of claim 1, wherein the indication of a destination device corresponds to a PSTN telephone number and the end-user device provides DTMF signals, corresponding to the PSTN telephone number, via the telephony port.

3. The end-user device of claim 1, wherein the routing controller is further for
   receiving an audio communication that includes data from the audio interface and an indication of another destination device, and in response to the indication,
   establishing a connection to the another destination device using the telephony port, thereby providing audio communications between the audio interface and the another destination device.

4. The end-user device of claim 1, wherein the routing controller is further for
   receiving an audio communication that includes data from the audio interface and an indication of another destination device, and in response thereto,
   establishing a connection to the another destination device using the packet-based interface, thereby providing audio communications between the audio interface and the another destination device.

5. The end-user device of claim 1, wherein the audio interface is a Foreign-Exchange Service port and the telephony port is a Foreign Exchange-Office port.

6. The end-user device of claim 1, wherein the routing controller is further for receiving, from the telephony port, an audio communication and routing the audio communication to the audio interface.

7. The end-user device of claim 1, wherein, for each audio communication received from the audio interface, in response to the routing controller currently providing audio communications between the packet-based interface and the telephony port, the end-user device is configured to provide a data communication via the packet-based interface, the data communication indicating that the currently provided audio communications between the packet-based interface and the telephony port are to be overridden by the audio communication from the audio interface.

8. The end-user device of claim 1, wherein the packet-based interface connects to the Internet.

9. The end-user device of claim 1, wherein the routing controller is further for limiting, based upon an operational restriction, use of the packet-based interface by other devices providing audio communications that are routed from the packet-based interface to the telephony port.

10. The end-user device of claim 9, wherein the operational restriction is an amount of time that a particular contacting device is allowed access to the user device.

11. The end-user device of claim 9, wherein the operational restriction is a maximum differential duration the end-user device is allowed to communicate between the audio interface and the packet-based interface and the duration other contacting devices are allowed access to the user device.

12. A method for routing audio communications, the method comprising:
   receiving, at an end-user device and from a packet-based interface, audio communication data that includes an indication of a destination device,
   determining if the indication of a destination device indicates the end-user device that is addressable by a telephone line having a corresponding telephone number,
   providing, in response to determining that an end user device corresponds to the destination device, the audio communication data to an audio interface,
   providing, in response to determining that the destination device corresponds to a destination device other than the end-user device, the audio communication data to a telephony port corresponding to the telephone line having the corresponding telephone number,
   interrupting communications between the destination device other than the end-user device, in response to an outgoing call being initiated by the end-user device and a rule establishing priority of the audio interface over audio communication data from the packet-based interface; and
   connecting the outgoing call over the telephone line having the corresponding telephone number.

13. The method of claim 12, wherein the indication of a destination device corresponds to a PSTN telephone number and the step of providing the audio communication data to the telephony port includes providing DTMF signals corresponding to a PSTN telephone number corresponding to the destination device.

14. The method of claim 12, further including the steps of:
   receiving an audio communication that includes data from the audio interface and an indication of another destination device, and in response thereto, and in response to the indication,
   establishing a connection to the another destination device using a telephony port, thereby providing audio communications between the audio interface and the another destination device.

15. An apparatus, comprising:
   an end-user device and a computer arrangement;
   the end-user device including:
   a telephony port for connecting to a local PSTN,
   an audio interface for communicating audible sounds in response to receiving audio communication data, a packet-based interface for connecting to a packet-based network, and a routing controller configured and arranged for receiving, from the packet-based interface, audio communication data that includes an indication of a destination device, for providing, in response to determining that the end-user device corresponds to the destination device, the audio communication data to the audio interface, and for providing, in response to determining that the destination device corresponds to a destination device other than the end user device, the audio communication data to the telephony port; and the computer arrangement including a computer circuit and being arranged for receiving an audio communication request, the request indicating a desired telephone number;

accessing a database to identify a user device connected to a PSTN local to the desired telephone number, the user device addressable by a telephone line corresponding to a telephone number other than the desired telephone number, the user device also connected to a packet-based network; and sending a request over the packet-based network, the request including instructions that the user device create a connection to the desired telephone number over the PSTN local to the desired telephone number and route audio communications from the packet-based network to the connection to the desired telephone number over the a telephone line corresponding to the telephone number other than the desired telephone number.

16. The apparatus of claim 15, wherein the computer arrangement is further arranged for monitoring established connections to route audio communications from the packet-based network to the connection to the desired telephone number; and crediting an account associated with the user device in response to the monitored audio communications.

17. The apparatus of claim 15, wherein the audio communication request is received from a user device associated with a telephone number provided from a remote PSTN.

18. The apparatus of claim 15, wherein the computer arrangement is further arranged for monitoring audio communication connections established through a plurality of user devices, each user device providing local audible communications; and providing credits on behalf of user devices of the plurality of user devices that provide audio communication connections between two other user devices of the plurality of user devices.

19. The apparatus of claim 15, wherein the computer arrangement is further arranged for monitoring established connections to route audio communications from the packet-based network to the connection to the desired telephone number; and crediting an account associated with the user device in response to the monitored audio communications, and wherein the audio communication request is received from a user device associated with a telephone number from a remote PSTN.

20. The apparatus of claim 15, wherein, for each audio communication received from the audio interface, in response to the routing controller currently providing audio communications between the packet-based interface and the telephony port, the end-user device is configured to provide a data communication via the packet-based interface, the data communication indicating that the currently provided audio communications between the packet-based interface and the telephony port are to be overridden by the audio communication from the audio interface.

21. The apparatus of claim 15, wherein the routing controller is further for limiting, based upon an operational restriction, use of the packet-based interface by other devices providing audio communications that are routed from the packet-based interface to the telephony port.

22. The apparatus of claim 21, wherein the operational restriction is one of: an amount of time that a particular contacting device is allowed access to the user device; and a maximum differential duration the user device is allowed to communicate between the audio interface and the packet-based interface and the duration other contacting devices are allowed access to the user device.

* * * * *